Nov. 11, 1941.  S. A. CARLSON  2,262,383
VEGETABLE PEELER
Filed Sept. 19, 1940  2 Sheets—Sheet 2

INVENTOR:
Stanley A. Carlson

Patented Nov. 11, 1941

2,262,383

UNITED STATES PATENT OFFICE 2,262,383

VEGETABLE PEELER

Stanley A. Carlson, Passaic, N. J.

Application September 19, 1940, Serial No. 357,346

10 Claims. (Cl. 146—50)

The present invention relates to vegetable peelers and is more particularly concerned with machines for peeling potatoes.

The object and general nature of this invention is the provision of a potato peeler in which a rotatable abrasive member, on which the potatoes are supported, is driven in such a manner as to grind off the outer skin or peeling from potatoes and other vegetables rapidly and efficiently. An important feature of this invention is the provision of a rotary hopper bottom member which is coated or otherwise provided with an abrasive surface and which, in addition, is provided with means for agitating the potatoes so as to secure, in effect, a generally vertical circulation of the potatoes, whereby all are peeled uniformly with the least possible loss.

More specifically, it is a feature of this invention to provide a vegetable peeler of the abrasive disc type in which the disc is formed with or carries raised sections that impart vertical movement to the potatoes. Preferably, the raised sections or humps also have an abrasive surface so that, in addition, to thoroughly mixing the potatoes, they cooperate with the disc proper in removing the peelings.

Another feature of this invention is to provide a vegetable peeler in which the driving mechanism is compactly arranged in the lower part of the supporting housing so that the machine is free of protruding parts, is readily portable, and is easy to clean.

These and other objects and advantages of the present invention will be apparent to those skilled in the art after a consideration of the following detailed description of the preferred form of my invention, which is illustrated in the accompanying drawings.

Figure 1:
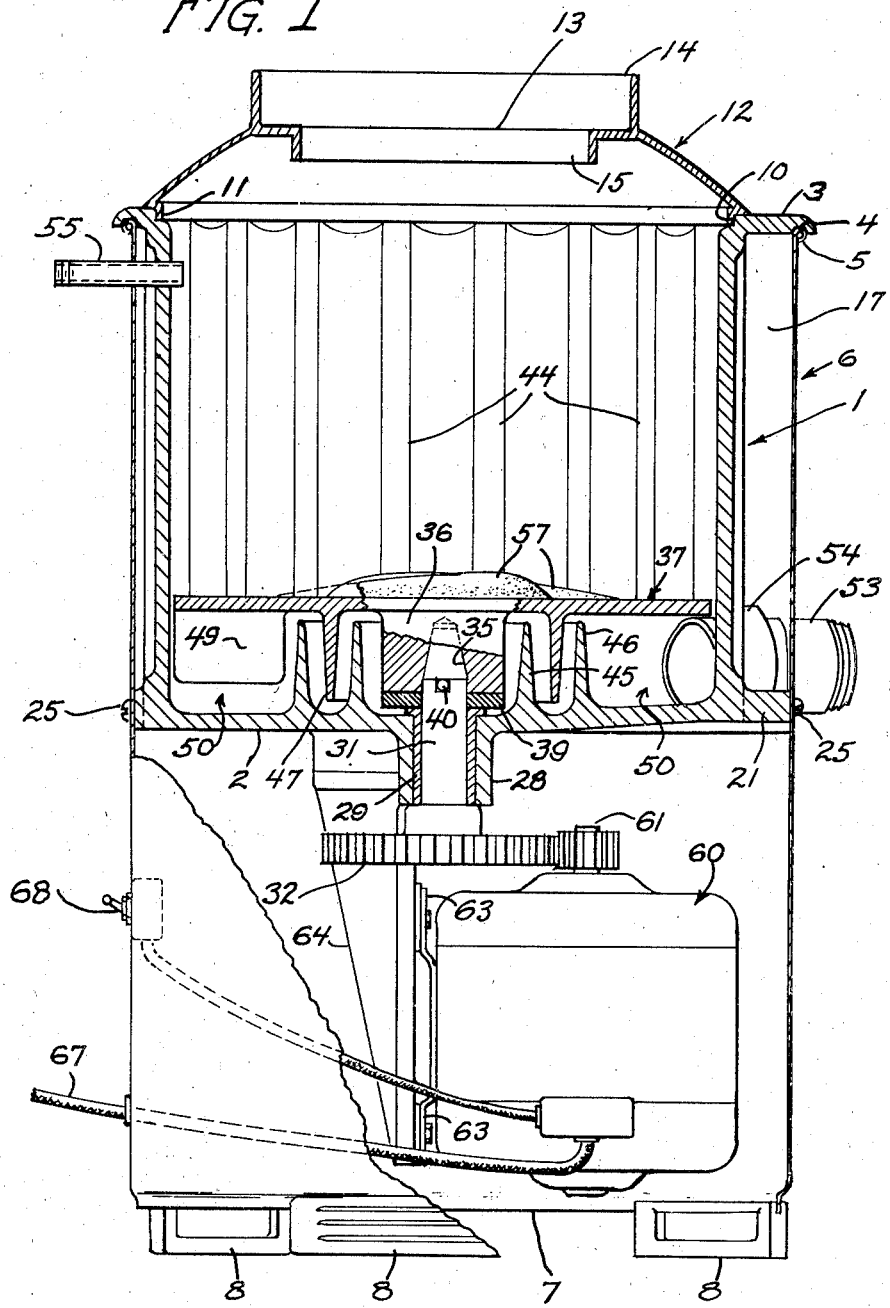
Figure 1 is a vertical section of a vegetable peeler in which the principles of the present invention have been incorporated.

The vegetable peeler of the present invention comprises a pot or hopper 1, preferably formed of cast aluminum or the like, which is closed at its lower end 2 and is open at its upper end and has a radially outwardly extending flange 3. The lower face of the latter has a groove 4 to receive the upper beaded end 5 of an enclosing and supporting casing of generally cylindrical construction. The lower end 7 of the latter is turned inwardly and receives three supporting blocks 8.

The upper end of the hopper 1 is formed with a groove 10 to receive the lower flange 11 of a cover 12 which has an open mouth 13 and upper and lower flanges 14 and 15. The hopper 1 and the enclosing and supporting casing are disposed eccentrically, which forms a space 17 between the hopper and one side of the casing.

The bottom of the hopper 1 is formed with three lugs 21, 22 and 23 which cooperate with the flange 3 to locate the hopper in the casing. Screws 25 serve to hold the hopper in position in the casing. The hopper bottom wall 2 is also provided with a downwardly extending bearing sleeve section 28 in which a vertical shaft is journaled for rotation in suitable bearing means 29. The lower end of the shaft, which is indicated by the reference numeral 31, receives a spur gear 32 and the upper end of the shaft is tapered and is received in a socket 35 formed in the hub section 36 of an abrasive disc, indicated in its entirety by the reference numeral 37. The hub 36 seats on an anti-friction thrust bearing 39 and is removable by merely lifting the disc member 37 off the upper end of the shaft 31. A pin 40 or the like establishes a driving connection between the shaft 31 and the disc 37.

The inner wall of the hopper 1 above the disc member 37 is provided with vertical ribs 44 to give the potatoes or other vegetables a certain amount of horizontal agitation, and the lower wall 2 of the hopper 1 is formed with two spaced apart concentric upstanding flanges 45 and 46. A depending flange 47 is formed on the body of the disc member 37 and is concentric with the hub 36, lying between the two upstanding flanges 45 and 46. Also depending from the lower face of the disc member 37 is a vane 49 which is disposed near the rim of the member 37 and rotates therewith between the outer wall of the hopper 1 and outermost flange 46, in an annular space indicated by the reference numeral 50 with which an outlet pipe 53 of relatively large diameter communicates. The pipe 53 is fastened securely in leaktight relation in a sleeve section 54. The latter is disposed in the space 17 between the hopper 1 and the side of the supporting casing 6. An inlet pipe 55 is disposed at the other side.

Figure 2:
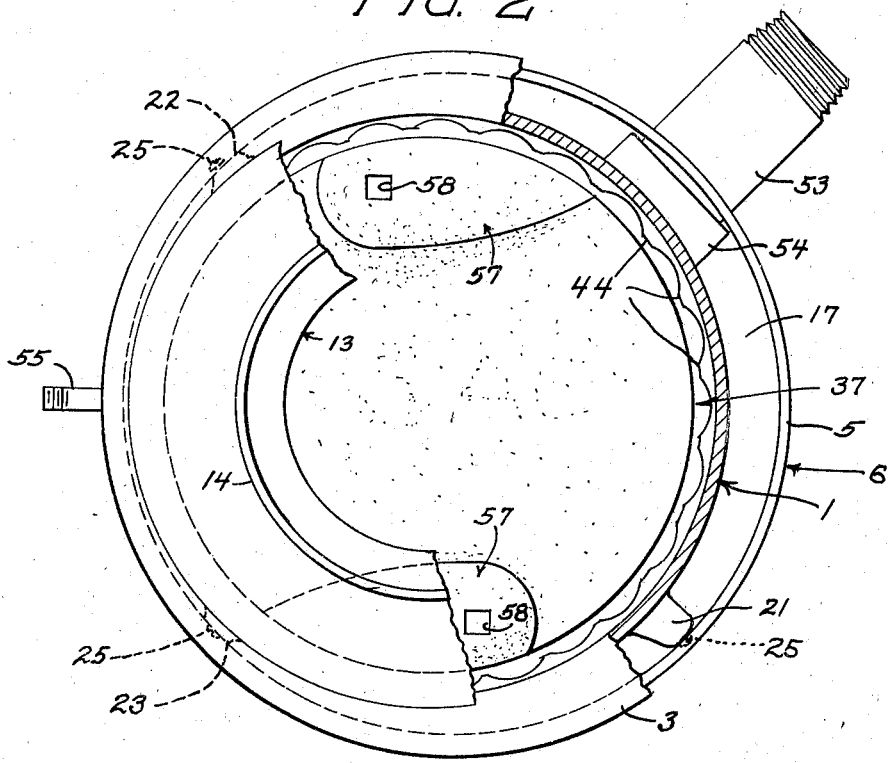
Figure 2 is a top or plan view, certain parts being broken away.
Figure 3:
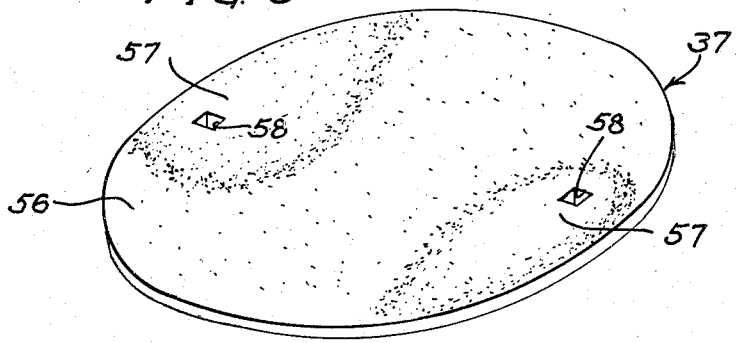
Figure 3 is a perspective of the peeling disc.

The peeling disc 37 is preferably formed of cast iron or the like and its upper surface is provided with an abrasive coating indicated at 56. The upper surface of the member 37 is flat or planar except for two raised sections or humps 57 disposed at the rim or periphery of the disc 37 and in diametrically opposite positions, as best shown in Figure 2. The upper surfaces of the raised sections 57 are, like the main body of the disc 37, coated with an abrasive. Preferably, as best shown in Figure 3, the upper surfaces of the humps 57 join smoothly with the rest of the surface of the disc. The upper surface of the latter is flat except for the humps. Disc 37 is lifted out by hand holes 58.

The disc 37 is driven by driving mechanism disposed compactly in the lower part of the casing 6 underneath the hopper 1. The driving mechanism comprises a motor 60 arranged with its driving shaft 61 disposed in a vertical position and to the upper end of which is secured a driving pinion 62 which meshes with the spur gear 32 that is fixed to the lower end of the disc shaft 31. The motor 60 is supported in any suitable manner, as by lugs 63, on a bracket 64 depending from the bottom 2 of the hopper 1. The bracket is formed and placed so that the gear 32 clears the bracket and so that the motor 60 is disposed in that side of the casing 6 adjacent the space 17. In other words, as shown in Figure 1, the axis of the hopper 1 and the shaft 31 are displaced to the left, relative to the casing 6, so as to provide ample room for the motor, yet the whole of the driving mechanism is disposed in the casing 6 and protected thereby. Suitable conductors 67 lead current in to the motor, under the control of a switch 68 and connections therefrom to the motor.

The operation of the vegetable peeler described above is substantially as follows:

A charge or batch of, say, potatoes of about ten or fifteen pounds is put in the hopper 1 and the motor is started. This rotates the peeling disc 37 and the peelings are ground away from the potatoes. The two raised sections 57 on the rim of the disc constantly change the position of the potatoes, imparting to them a generally vertical circulation; in other words, the potatoes that originally laid on the disc are thrown upward and the potatoes on the top drop to the bottom. During the peeling operation a hose is connected to the inlet 55 and a suitable source of supply and water is circulated through the potatoes. This carries the peelings, sand, grit and the like down into the annular chamber 50, and the material is then given a swirling movement by the vane 49 on the rotating disc 37. Centrifugal action thus forces the water, peelings, grit, dirt and the like out the outlet 53 to a suitable point of discharge. The outlet 53, it will be noted, is of generous size so that the refuse material flows freely out of the machine. The disposition of the motor 60 vertically and mounting it by the vertical bracket 64 which is fastened to the lower wall of the hopper 1 make for an extremely compact unit, specifically one in which the outer or supporting casing is a simple cylindrical member, with the hopper in the upper part and all of the driving mechanism in the lower part. This protects the mechanism, eliminates splash guards and other protruding parts that take up space, and renders the mechanism practically soundproof.

While I have shown and described above the preferred construction in which the principles of my invention have been embodied, it is to be understood that my invention is not to be limited to the particular details shown and described above, but that, in fact, widely different means may be utilized in carrying out the broader aspects of my invention.

What I claim, therefore, and desire to secure by Letters Patent is:

1. A vegetable peeler comprising an outer casing, a vegetable hopper having an upper radially outwardly extending flange receiving and supported on the upper edge of the casing, the flange being eccentric with respect to the main body of the hopper, whereby the latter is supported within the casing adjacent one side thereof with a space between the hopper and the other side of the casing, peeling means in said hopper, the latter having an opening therein adjacent said other side of the casing, and a sleeve communicating with said hopper opening and disposed in said space.

2. A vegetable peeler comprising an outer casing, a vegetable hopper supported in the upper part of said casing in eccentric relation, so as to dispose the axis of the hopper closer to one side of the outer casing than the other, a peeling disk mounted rotatably in the hopper coaxially thereof, a shaft extending through the bottom of the hopper for driving the peeling disk, a gear on the lower end of said shaft, and driving mechanism in the lower part of the casing below the hopper and including a motor disposed in said casing adjacent said other side of the hopper and a pinion on the shaft of the motor meshing with the gear on said disk driving shaft for driving the latter.

3. A vegetable peeler comprising an outer casing, a vegetable hopper supported in the upper part of said casing in a generally vertical position therein with its vertical axis displaced toward one side of the casing in eccentric relation therewith, a rotatable peeling disc in the lower part of the hopper, a shaft extending downwardly through the bottom wall of the hopper, a spur gear on the lower end of said shaft, a bracket depending from the lower wall of said hopper, and a motor mounted on said bracket and disposed in vertical position underneath said hopper and within the lower part of said casing adjacent the other side thereof, said motor having a pinion meshing with said spur gear.

4. A vegetable peeler comprising an outer casing, a vegetable hopper having an upper radially outwardly extending flange receiving and supporting the hopper on the upper edge of the casing, said flange being eccentric with respect to the main body of the hopper, whereby the latter is supported within the casing adjacent one side thereof with a space between the hopper and the other side of the casing, locating lugs on said hopper, said lugs corresponding to the degree of eccentricity of the hopper relative to the casing, a rotatable peeling disc removably supported for rotation in said hopper, a shaft for driving said peeling disc, a bracket formed integrally with the bottom of said hopper and extending downwardly therefrom alongside said shaft, a gear on the latter, a driving motor supported on said bracket and having a driving pinion meshing with said gear, said motor being supported by said bracket in a vertical position adjacent the other side of said casing, means for circulating drain water through the hopper, said peeling disc being supported above the bottom of the hopper, an outlet from the hopper below the peeling disc and above the bottom of the hopper, and a vane on the lower side of the peeling disc for delivering peelings, dirt and the like to said outlet.

5. A vegetable peeler comprising an outer casing, a vegetable hopper having an upper radially outwardly extending flange receiving and supporting the hopper on the upper edge of the casing, said flange being eccentric with respect to the main body of the hopper, whereby the latter is supported within the casing adjacent one side of the latter with a space between the hopper and the other side of the casing, a rotatable peeling disc supported for rotation in said hopper, a shaft for driving said peeling disc, a bracket extending downwardly from the bottom of the hopper alongside said shaft, a gear on the latter, and a driving motor supported on said bracket and having a driving pinion meshing with said gear, said motor being supported by said bracket in a vertical position adjacent the other side of said casing.

6. A vegetable peeler comprising a substantially cylindrical outer supporting casing, an inner hopper having a flange at its upper end and a closed lower end, said flange being eccentric with respect to the hopper, whereby the axis of the latter is spaced closer to one side of said casing than the other side, a rotor supported above the bottom of said hopper for rotation about the axis thereof, a driving shaft for said rotor extending through the bottom of said hopper, a gear fixed to the lower end of said shaft for rotation therewith in a horizontal plane, a bracket depending from said hopper bottom, a motor disposed in a vertical position within the lower part of said casing below said hopper and generally in the larger space between the axis of said driving shaft and gear and said other side of the casing, and a gear on the motor shaft meshing drivingly with the gear on said rotor shaft.

7. A vegetable peeler comprising a supporting casing, a hopper disposed within the upper part of said casing and supported thereby, said hopper having a closed bottom and an outlet sleeve projecting generally laterally outwardly for accommodating the discharge of peelings and the like from the interior of the hopper, and a discharge pipe extending through said supporting casing and connecting with said sleeve, said hopper being supported eccentrically within said supporting casing so as to provide space at one side of the hopper and the casing to accommodate said sleeve.

8. The invention set forth in claim 7, further characterized by vane means depending from the radially outer part of said peeling disc and spaced radially from the flange on the disc a distance sufficient to accommodate the outer of said upstanding concentric flanges on the hopper bottom.

9. A vegetable peeler comprising a supporting casing, a hopper disposed within said casing and supported thereby in eccentric relation so that there is a greater space between one side of the hopper and said casing than at the other side of the hopper and casing, said hopper having an outlet sleeve at said one side of the hopper extending generally laterally outwardly in said space, and a discharge pipe extending through said casing and connecting with said sleeve so as to receive peelings and the like discharged from said hopper.

10. A vegetable peeler as set forth in claim 9 further characterized by a relatively short attaching lug at the side of said hopper opposite said sleeve and one or more longer lugs on said hopper spaced peripherally from said sleeve, said lugs serving to space said hopper in said casing in said eccentric relation.

STANLEY A. CARLSON.